// United States Patent [15] 3,660,109
Lay [45] May 2, 1972

[54] PRODUCTION OF PARBOILED RICE

[72] Inventor: William A. Lay, Houston, Tex.
[73] Assignee: Carus Chemical Company, Inc., LaSalle, Ill.

[22] Filed: Dec. 11, 1969
[21] Appl. No.: 884,382

[52] U.S. Cl. ....................99/80 PS
[51] Int. Cl. ....................A23l 1/10
[58] Field of Search....................99/80, 80 PS, 83, 253, 230, 99/232

[56] References Cited

UNITED STATES PATENTS

| | | | |
|---|---|---|---|
| 2,752,247 | 6/1956 | Chandler | 99/80 PS |
| 3,189,462 | 6/1965 | Autrey et al. | 99/80 PS |
| 2,808,333 | 10/1957 | Mickus et al. | 99/80 PS |

OTHER PUBLICATIONS

Rose " The Condensed Chemical Dictionary," 5th Edition, pgs. 897– 898, QD5 1956 C. 12, Reinhold Publishing Corp., New York

*Primary Examiner*—Raymond N. Jones
*Attorney*—Johnston, Root, O'Keeffe, Keil, Thompson & Shurtleff

[57] ABSTRACT

Treating of rice grain, while still covered by its hull, with aqueous potassium permanganate prior to steaming of the rice in processes for producing parboiled rice. The permanganate treatment has the effect of fixing or destroying color bodies in the hull to prevent their migration onto the surface of the starchy endosperm in the subsequent steaming and drying steps and thus prevent color impartation to the parboiled rice.

5 Claims, No Drawings

PRODUCTION OF PARBOILED RICE

INTRODUCTION

The parboiling of rice as it is practiced in the U.S. today is an involved manufacturing process but it is basically similar to the open kettle, hand operations that have been carried out in the Orient for centuries. The mechanized process of the U.S. has been adopted by other countries only recently. Almost all methods of parboiling, from the most primitive village operation to the most complex manufacturing plant, have similar steps of soaking rough rice, steaming, drying, and milling. Each manufacturer has his own variations of these basic operations.

Parboiled rice is a fully precooked product in a dense form that does not allow the starch granules to take up water rapidly. Cooking time for food preparation remains about the same as raw rice. Even through it is not an instant or even a quick-cooking product, parboiled rice has the advantage of being more nutritious, more resistant to insect infestation, more stable in shape and less likely to be sticky or mushy after cooking. Prior to the milling step it has a slightly flexible quality which lends toward less breakage of individual grains in the milling process. This results in yield increases over raw rice that almost completely offset the cost of the parboiling operation and places the cost of parboiled rice approximately on an equal basis with raw rice. Relative cost also leans in favor of parboiled rice for processed food items because of the definitely greater volume per unit weight realized by parboiled rice as compared to raw rice.

There are two notable disadvantages to parboiled rice. The small mount of fat present is quite easily oxidized to produce strong rancidity. This has been overcome with the addition of anti-oxidants. A more serious problem is encountered in the color change during parboiling. Some of the colorants present in the hull and bran of rough rice migrate during parboiling to the outer part of the starchy rice grain to produce a slightly different flavor and the formation of a light tan color. This change in color has been an adverse factor in those rice consuming areas where whiteness of rice is the criterion of quality.

One technique in common practice is the bleaching of the rough rice with sodium bisulfite solution to inhibit discoloration of the starchy endosperm of the parboiled rice. The sodium bisulfite solution is relatively dilute, e.g., in the order of 0.1 to 0.6 percent. This technique inhibits the discoloration, but it is not entirely satisfactory due to inconsistent whiteness of the parboiled rice and the imparting of an aftertaste to the finished rice if the bisulfite is used in excess.

Another technique which has been tried for rice bleaching in the production of parboiled rice is the use of sulfur dioxide. In terms of bleaching results, the sulfur dioxide functions well, but it imparts an objectionable taste to the rice. A rancidity problem can also arise if the rice bran is disturbed and the bleaching action begins to form peroxide aldehyde type compounds.

THE INVENTION HEREIN

The generally employed commercial techniques for producing parboiled rice embody a series of steps in the following sequence: (1) steeping of the rough rice in water for several hours at elevated temperature, e.g., 3 to 4 hours at 140° to 160° F.; (2) steaming; (3) drying; (4) milling of the dried rice grains to remove the hull; (5) grinding the milled grains to remove the bran; and (6) polishing the rice grain endosperm.

The subject invention concerns this in the production of parboiled rice wherein a dilute, preferably neutral or alkaline solution of an alkali metal permanganate, preferably potassium permanganate, is used in the first stages of the process to bring the alkali metal permanganate into contact with the hulls of the rice grains to provide a fixation or oxidation of the color bodies contained mainly within the intensely colored hull. This treatment may be carried out during a part of the whole of the steeping of the rough rice in water or it may be carried out in a separate step either preceding or following the steeping operation. In general, the solution has an alkali metal permanganate concentration in the range of 0.5 to 10 grams per liter with an optimum concentration of 1.5 to 3.5 grams per liter. The pH of the permanganate solution may be acid, neutral or alkaline over the broad range of 1.5 to 11 with a preferred range in terms of best overall results of pH3 to 9.5. As a practical matter, however, alkaline solutions produce a faster reaction between the permanganate and the color bodies than do acid solutions. Also from an equipment corrosion viewpoint, the alkaline solutions are preferred. Accordingly the optimal preferred pH range for the aqueous permanganate solutions is from about 7 to 9.5.

The rough rice grains are steeped in the permanganate solution at elevated temperature, preferably in the range of about 40° to 70° C. with an optimum in the order of 50° C. The steeping time is sufficient to permit substantially complete consumption of the permanganate and may range over a period of 20 minutes to 4 hours. In general 30 to 60 minutes is sufficient for substantially complete permanganate consumption. The permanganate consumption is by way of oxidation of the organic substrate, i.e., the rice hulls and can be expressed by the following general equation

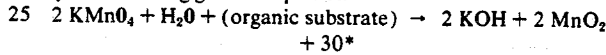

$$2\ KMn0_4 + H_20 + \text{(organic substrate)} \rightarrow 2\ KOH + 2\ MnO_2 + 30^*$$

*chemically combined with substrate

The byproduct of these permanganate reactions is a hydrous form of a dark-colored manganese dioxide which is water insoluble and possesses a significant sorptive capacity.

At the completion of the permanganate steeping step, the hulls of the rice grains assume a darker brown color caused by deposits of hydrous manganese dioxide. The brown-colored steeping solution is drained from the rice grains, whereafter that they may be washed to remove residual steeping solution and any manganese dioxide loosely adhered to the hulls of the rice grain.

As an alternative, the manganese dioxide may be chemically removed from the rice grain hulls by treatment with sodium bisulfite or sulfur dioxide in aqueous solution. It is advantageous to first drain the manganese dioxide-containing steeping solution to thus eliminate the major part of the manganese dioxide without treating chemical cost. Thereafter acidified sodium bisulfite solution or sulfur dioxide in aqueous solution is added to the steeped rice grains. The brown hydrous manganese dioxide is converted within a few minutes into water soluble, almost colorless, divalent manganese sulfate. This solution can then be drained, whereafter the rice grains may then be washed with water to remove residual soluble manganese sulfate.

The steaming, drying, milling, grinding and polishing steps do not per se constitute a part of the subject invention. The conventional procedures may be used for these steps, e.g., a steaming time in the order of 5 to 30 minutes at 104° to 127° C. and a drying time in the order of 45 to 120 minutes at 45 to 90° C. Milling, grinding and polishing are well known mechanical operations and need not be described herein in detail.

The invention heretofore described and the advantages accruing therefrom will be further appreciated from the following specific examples.

EXAMPLE 1

A steeping solution containing 16.3 grams of $KMnO_4$ in 2.5 gallons of water is heated to approximately 160° F. and applied to 18 lbs. of rice in a steeping vat. The initially dark purple color of the steeping solution changes gradually to brown, indicating the progress of the oxidation reaction. The reaction is completed (i.e., essentially all of the $KMn0_4$ is consumed) after approximately 30 minutes, leaving the hulls of the rice grains with a darker brown color caused by deposits of hydrous manganese dioxide. Under proper circumstances, the permanganate action is confined to the hull only with no obvious evidence of $KMnO_4$ attack on the grain. At this point the brown-colored steeping solution may be drained and the rice may be washed with water to remove the suspended $MnO_2$. This wash may also remove any $MnO_2$ which may be loosely adhering to the rice grains.

As an alternate, the $MnO_2$ can be chemically removed by treatment with sodium bisulfite ($NaHSO_3$) or $SO_2$ in aqueous solution. If this is desired, the $MnO_2$-containing steeping solution is acidified with sulfuric acid to a pH of 3.2, and 32 grams of $NaHSO_3$ is added. The brown $MnO_2$ is converted within minutes to soluble, almost colorless, divalent manganese sulfate. This solution can then be drained and the product washed with water to remove the soluble Mn.

The above method can be advantageously modified by first draining the $MnO_2$-containing steeping solution, thus eliminating the major part of the $MnO_2$ without chemical cost. Then, acidified $NaHSO_3$ solution (pH 3.2) is applied, with only about one-third of the above quantity of $NaHSO_3$ required (approximately 10 grams $NaHSO_3$ in 2 gallons of water). Removal of the solubilized Mn can be effected by washing with water as mentioned above. The rice is then steamed and dried under optimum conditions. The remaining steps in the customary production process for the parboiled rice (milling, grinding and polishing) are carried out as usual.

EXAMPLE 2

Laboratory tests were run with both alkaline and acid potassium permanganate solutions in which rough rice grains were immersed to ascertain the respective reaction times as measured by substantially complete consumption of the permanganate. In each of these tests 250 grams of rough rice were treated with 250 milliliters of the respective solutions listed below until substantially all of the potassium permanganate was reduced. The treating temperature in each case was 60° C. The hydrous manganese dioxide formed was removed by adding dry sodium bisulfite to the liquor at the end of the reaction, after which the liquor was drained off the rice grains. The rice grains were then washed three times with water and dried in an oven at 50° C.

The tests conducted are listed in the table below.

| Test number | pH conditions | Normality of soln. | Percent $KMnO_4$ in soln. | Actual g. of $KMnO_4$ per lb. of rice | Reaction time, min. |
|---|---|---|---|---|---|
| I | Acid | 0.5 N $H_2SO_4$ | 0.5 | 2.27 | 25 |
| II | do | 0.25 N $H_2SO_4$ | 1.0 | 4.54 | 55 |
| III | Alkaline | 0.5 N NaOH | 0.5 | 2.27 | 10 |
| IV | do | 0.25 N NaOH | 1.0 | 4.54 | 20 |

EXAMPLE 3

Potassium permanganate was added to water in the ratio of 16.3 grams $KMnO_4$ per 25 gallons of water. After heating to about 160° F., the solution was recycled through three parallel cookers, each containing 6 lbs. of rough rice. All $KMnO_4$ was reduced after approximately one-half hour of reaction time. After steaming, a part of the rice was dried. The bleaching results observed were very satisfactory. The potassium permanganate did not appear to have penetrated beyond the hulls. Hydrous manganese dioxide deposits were noted only on the outer hull surface.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. In a process for producing parboiled rice wherein rough rice is subjected to soaking, steaming and milling, the improvement which comprises treating rough rice prior to dehulling thereof with an aqueous solution of an alkali metal permanganate, said solution having an alkali metal permanganate concentration in the range of 0.5 to 10 grams per liter, for a period of at least 20 minutes under conditions effecting oxidation by said alkali metal permanganate of the color bodies in the hulls of said rough rice.

2. The improvement as claimed in claim 1, wherein said solution is in contact with said rough rice over a period of 20 minutes to 4 hours.

3. The improvement as claimed in claim 2, wherein the temperature of said solution is in the range of about 40° to 70° C.

4. The improvement as claimed in claim 3, wherein said solution has an alkali metal permanganate concentration of 1.5 to 3.5 grams per liter and a pH in the range of about 7 to 9.5.

5. The improvement as claimed in claim 1, wherein said rough rice, after said contact with said alkali metal permanganate solution, is subjected to steaming, drying, and milling to remove said hulls to yield white rice grains substantially free from discoloration.

* * * * *